United States Patent
Kondo et al.

(10) Patent No.: US 11,177,499 B2
(45) Date of Patent: Nov. 16, 2021

(54) ASSEMBLED BATTERY

(71) Applicant: Toyota Jidosha Kabushiki Kaisha, Toyota (JP)

(72) Inventors: Minako Kondo, Toyota (JP); Keiichiro Kobayashi, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 74 days.

(21) Appl. No.: 16/229,702

(22) Filed: Dec. 21, 2018

(65) Prior Publication Data

US 2019/0198910 A1 Jun. 27, 2019

(30) Foreign Application Priority Data

Dec. 22, 2017 (JP) .............................. JP2017-247080

(51) Int. Cl.
*H01M 10/0587* (2010.01)
*H01M 10/625* (2014.01)
(Continued)

(52) U.S. Cl.
CPC ... *H01M 10/0431* (2013.01); *H01M 10/0481* (2013.01); *H01M 10/0587* (2013.01);
(Continued)

(58) Field of Classification Search
CPC ........... H01M 10/0431; H01M 10/613; H01M 10/0587; H01M 10/6557; H01M 10/0481;
(Continued)

(56) References Cited

U.S. PATENT DOCUMENTS

2010/0310912 A1* 12/2010 Kim ..................... H01M 10/052
429/94
2012/0214041 A1* 8/2012 Harada ............... H01M 10/613
429/120
(Continued)

FOREIGN PATENT DOCUMENTS

CN 102439755 A 5/2012
CN 102473981 A 5/2012
(Continued)

OTHER PUBLICATIONS

Machinet translation of JP 2015011895 (as cited in the IDS on Dec. 21, 2018).*

*Primary Examiner* — Bethany L Martin
(74) *Attorney, Agent, or Firm* — Dinsmore & Shohl LLP

(57) ABSTRACT

The present disclosure provides an assembled battery having a plurality of unit cells, spacers disposed so as to sandwich the unit cells, and restraining members that restrain the unit cells and the spacers in an array direction X. In each unit cell, a flat wound electrode body having a winding end fixed by a fixing member is accommodated in a battery case. The spacers are provided with rib portions protruding towards long side surfaces of the battery case. Flat portions of the electrode body each have a pressing region including a pressing site that opposes the rib portions, and a moderation region other than the pressing region. The pressing region includes at least the center of each flat portion in a winding axis direction, and a first pressing region over a direction along a major axis. The fixing member is disposed at the moderation region.

20 Claims, 10 Drawing Sheets

(51) Int. Cl.
*H01M 10/613* (2014.01)
*H01M 10/6557* (2014.01)
*H01M 10/04* (2006.01)
*H01M 50/20* (2021.01)

(52) U.S. Cl.
CPC ....... *H01M 10/613* (2015.04); *H01M 10/625* (2015.04); *H01M 10/6557* (2015.04); *H01M 50/20* (2021.01); *H01M 2220/20* (2013.01)

(58) Field of Classification Search
CPC ............. H01M 10/625; H01M 2/1077; H01M 10/6551; H01M 50/20
See application file for complete search history.

(56) References Cited

U.S. PATENT DOCUMENTS

| | | | | |
|---|---|---|---|---|
| 2013/0040181 A1* | 2/2013 | Kim | ................... | H01M 10/613 |
| | | | | 429/120 |
| 2013/0078491 A1 | 3/2013 | Obata | | |
| 2016/0126604 A1* | 5/2016 | Hiroe | ................... | H01M 50/20 |
| | | | | 429/83 |
| 2016/0351941 A1* | 12/2016 | Kobayashi | ............ | H01M 2/305 |

FOREIGN PATENT DOCUMENTS

| | | |
|---|---|---|
| CN | 105576319 A | 5/2016 |
| JP | 2012230837 A | 11/2012 |
| JP | 2015011895 A | 1/2015 |
| JP | 2016091665 A | 5/2016 |

* cited by examiner

ASSEMBLED BATTERY

CROSS REFERENCE TO RELATED APPLICATIONS

The present application claims priority to Japanese Patent Application No. 2017-247080 filed on Dec. 22, 2017, the entire contents of which are incorporated into the present specification by reference.

BACKGROUND

The present disclosure relates to an assembled battery resulting from connection of two or more batteries in series or in parallel.

Assembled batteries have high capacity and afford high output, and accordingly are widely used for instance as main batteries in vehicles. Configurations are known, for instance as disclosed in Japanese Patent Application Publication No. 2016-091665 and Japanese Patent Application Publication No. 2012-230837, in which spacers are interposed between unit cells (which may also referred to as unit batteries) to form an array such that cooling air can be allowed to flow between the unit cells, in assembled batteries for uses where the battery is prone to generating heat in particular accompanying charging and discharging. For instance, Japanese Patent Application Publication No. 2016-091665 discloses the feature of securing a cooling space between unit cells by spacers, and evenly providing, over the entirety of the spacers, guiding ribs for causing cooling air to move along a predetermined route from an inflow port towards an outflow port. Such a configuration allows suppressing variability in temperature between unit cells.

The power generation elements in unit cells are typically stacked in a state where respective positive electrodes and negative electrodes are insulated for instance by a separator, a solid electrolyte or the like. Known configurations of power generation elements include a form in which an elongate positive electrode and an elongate negative electrode are stacked while insulated from each other by two separators, and the foregoing are wound several times about the transverse direction, as a winding axis, to yield an electrode body of wound type. Collector portions can be provided in this wound electrode body, at edges along the longitudinal direction of the electrodes, such that power is collected over a large surface area, divided into the positive electrode and the negative electrode, at both ends in the transverse direction. This is useful in that thereby charging and discharging can be carried out with high efficiency and with large currents, while allaying the concern of short-circuits. As disclosed for instance in Japanese Patent Application Publication No. 2015-011895, unwinding of the wound electrode body is prevented by fastening the winding end of the wound electrode body with an adhesive tape.

In batteries used by being charged and discharged with large currents at a high rate, and in batteries used in applications where vibration cannot be avoided during use, a problem arises however in that the distance between electrodes in the electrode body is prone to varying for each layer. This variation in the distance between electrodes may impair the performance of the battery. In the construction of the assembled battery, therefore, the battery may be restrained in a state where a load is applied in the array direction of the unit cells, so as to maintain a small constant inter-electrode distance, without slack. Wound electrode bodies are different from stacked electrode bodies in which plate-like power generation elements are stacked on each other, and tend to be more prone to accumulation of heat within the electrode body. Accordingly, it is preferable to use a combination of spacers having the above the rib portions, in unit cells provided with the wound electrode bodies. It has been found that assembled batteries having such a combination however suffer from a new problem, namely the likelihood of occurrence of micro short-circuits derived from precipitation (electrodeposition) of charge carriers in the electrode body.

SUMMARY

It is an object of the present disclosure, arrived at in the light of the above considerations, to provide an assembled battery that allows suitably suppressing electrodeposition, even when combining spacers provided with rib portions and unit cells provided with wound electrode bodies.

The art disclosed herein provides an assembled battery that includes: a plurality of unit cells each having a flat wound electrode body, and a battery case having a pair of opposing side surfaces and accommodating the flat wound electrode body, the unit cells being arrayed in an array direction that intersects the side surfaces; spacers disposed so as to sandwich the unit cells in the array direction, each spacer having a flat portion disposed so as to oppose the side surfaces, and a rib portion protruding from the flat portion towards the side surfaces; and a restraining member that restrains the arrayed unit cells and spacers, in such a manner that an inherent stress is present in a direction in which the unit cells and the spacers are compressed along the array direction. The flat wound electrode body is provided with an elongate positive electrode, an elongate negative electrode, and a fixing member; the positive electrode and the negative electrode are stacked so as to be insulated from each other and are wound, to yield an oval shape in a sectional view, about a winding axis that is a transverse direction perpendicular to a longitudinal direction, and a winding end is fixed by the fixing member; and the flat wound electrode body is accommodated in the battery case in such a manner that a flat portion, at which the positive electrode and the negative electrode are stacked in a direction along a major axis of the oval shape, opposes the side surfaces. The flat portion has a pressing region including a pressing site opposing the rib portion, and a moderation region other than the pressing region. The pressing region includes the center of the flat portion in the winding axis direction, and includes a first pressing region spanning a direction along the major axis. The fixing member is disposed in the moderation region.

Studies by the inventors have revealed that the dimension of the wound electrode body in the array direction is locally thick at the portion of the fixing member at the winding end. It has been found that when spacers having rib portions are used, the electrode body is acted upon by extra pressure in proportion to the thickness of the fixing member, and electrodeposition is locally promoted at the surface of the negative electrode opposing the fixing member. In the above configuration each spacer is disposed so that at least a central portion of the flat wound electrode body in the winding axis direction (hereafter also referred to as "width direction") is pressed over the major axis direction. Such a configuration allows the spacers to secure a cooling space between unit cells, whereby the cooling fluid can circulate effectively, and allows maintaining the inter-electrode distance small, without slack, at the flat portions of the flat wound electrode body. In each spacer there is formed a pressing region at which a pressing force is actively exerted by the rib portion to the flat portion, and a moderation region with a moderation margin in which no pressing force is actively exerted. The fixing member is disposed at the surface of the moderation region, and not at the surface of the pressing region, in the flat portion. Such a configuration allows suppressing the occurrence of a localized load in a plane direction (direction in which there spreads a plane parallel to the winding axis and the major axis), on the flat portion of the negative electrode, at which the fixing member is actively pressed by the rib portion, and allows suppressing formation of sites at which inter-electrode distance is very small. As a result it becomes possible to suppress precipitation of charge carriers (precipitation of metallic Li) derived from localized current concentration at the negative electrode surface.

In some embodiments, the pressing region includes a second pressing region provided over a direction along the major axis, at each of both ends of the flat portion in the width direction. In some embodiments, the unit cells each contain a nonaqueous electrolyte solution within the battery case. Such a configuration allows pressing more uniformly the flat portion as a whole, while providing a moderation region in the flat portion. As a result it becomes possible to press the flat wound electrode body while reducing localized pressing unevenness in the plane direction. In a configuration wherein unit cells provided with a flat wound electrode body contain a nonaqueous electrolyte solution, both ends of the flat wound electrode body in the winding axis direction can be pressed and closed by providing the second pressing region at both ends in the width direction. As a result, the moderation region functions also as a liquid-holding space for holding the electrolyte solution within the electrode body. Accordingly, an assembled battery having the above configuration is useful since the nonaqueous electrolyte solution is unlikelier to be pushed out of the electrode body even during repeated charging and discharging at a high rate. An assembled battery can be realized as a result that is excellent for instance in high-rate cycle characteristic. To achieve the above effect, the fixing member is not disposed at the second pressing region on both ends of the flat wound electrode body in the width direction.

In some embodiments, a dimension of the first pressing region in the winding axis direction is smaller than a dimension of the second pressing region in the winding axis direction. In some embodiments, both ends of the electrode body are sufficiently pressed at the second pressing region, for instance from the viewpoint of suppressing outflow of the nonaqueous electrolyte solution from the flat wound electrode body. Meanwhile, sufficient pressing action is easily afforded at the first pressing region positioned between the ends of the electrode body, in a state where both ends are pressed, even when the dimension of the first pressing region is set to be comparatively small in the width direction. The above configuration is likewise preferable from the viewpoint of allowing securing a greater surface area over the cooling space between the battery case and an adjacent unit cell in the vicinity of the central portion between unit cells, in the width direction, where heat accumulates readily.

In some embodiments, when the pressing region includes a third pressing region over the flat portion in the winding axis direction, the third pressing region is disposed within a top $2/3$ region in a direction along the major axis, with the assembled battery being disposed so that the major axis matches a vertical direction, and the moderation region is disposed at least at a bottom $1/3$ region in the direction along the major axis. In such a configuration, the rib portions for making up a flow channel that allows the cooling fluid (typically air) to flow suitably can be provided with a greater degree of freedom at the upper side of the spacer. Also, it becomes possible to secure a moderation region on the lower side, and to suitably suppress drainage of the nonaqueous electrolyte solution (present inside the flat wound electrode body but positioned at the bottom due to gravity) out of the electrode body, due to charging and discharging.

In some embodiments, the flat wound electrode body is provided with an R portion at which the positive electrode and the negative electrode are curved, the R portion being a portion other than the flat portion. The fixing member is not disposed at the R portion. Although details are unclear, the inventors have found that precipitation of a significantly large amount of charge carriers occurs at the surface of the negative electrode on the outermost periphery corresponding to the position at which the fixing member is disposed. This can be conceivably ascribed to a greater variability in inter-electrode distance than is the case in the flat portion, and to the fact the adverse effect derived from arranging the fixing member can manifest itself more prominently at the flat portion. Therefore, the configuration disclosed herein allows arranging the fixing member at an optimal position where electrodeposition can be suppressed, while keeping constant the inter-electrode distance at the flat portion, in an assembled battery having inherent compressive stress elicited by a restraining member.

In some embodiments, when the assembled battery is disposed so that the major axis matches a vertical direction, the spacers have an inflow portion at the bottom, and outflow portions at both ends in the winding axis direction. The rib portion is configured in the form of a flow channel wall that is erected along at least part of a flow channel extending from the inflow portion towards the outflow portions. Such a configuration allows designing flow channels having good cooling efficiency, in the cooling space of the spacers. As a result, heat accumulated between the unit cells can be dissipated efficiently for instance also during repeated charging and discharging at a high rate.

The above and other elements, features, steps, characteristics and advantages of the present disclosure will become more apparent from the following detailed description of the embodiments with reference to the attached drawings.

DETAILED DESCRIPTION

Figure 1:
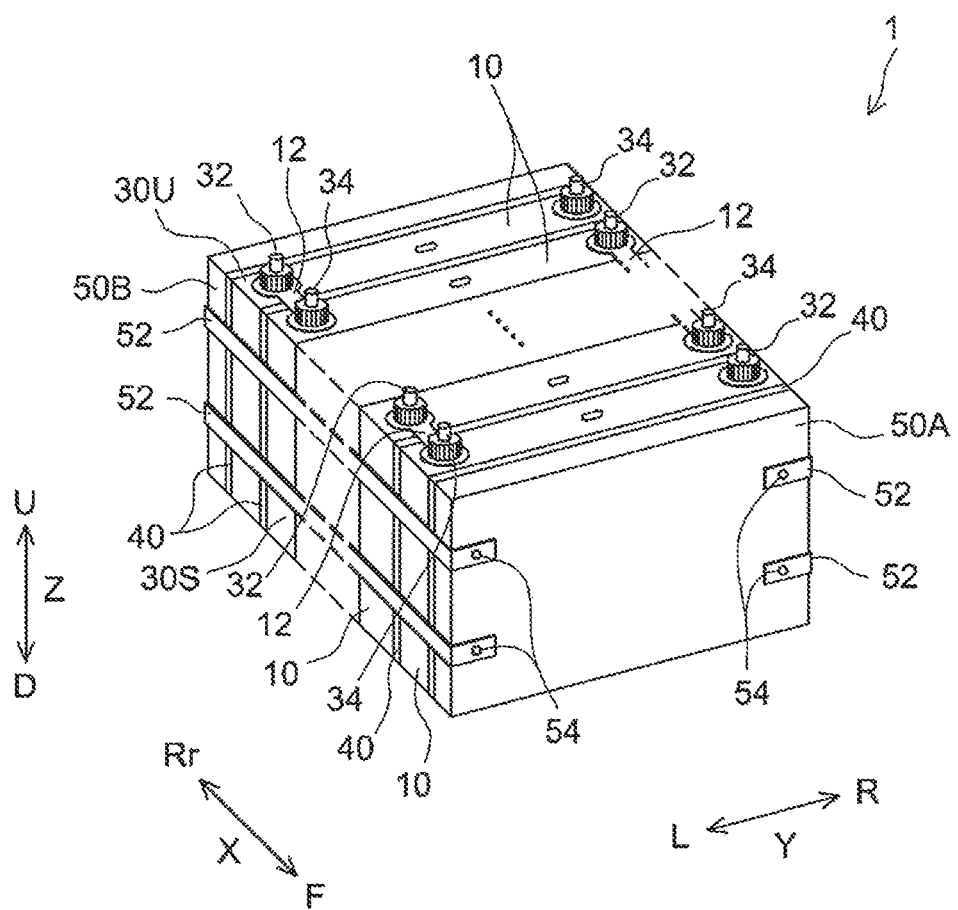
FIG. 1 is a perspective-view diagram illustrating schematically an assembled battery according to an embodiment.

Embodiments of the present disclosure will be explained below with reference to accompanying drawings. Needless to say, the embodiments explained herein are not meant to limit the present disclosure in any particular way. The assembled battery disclosed herein can be realized on the basis of the disclosure of the present specification and common technical knowledge in the relevant technical field. In the present specification a numerical value range notated as "X to Y" denotes "a value equal to or larger than X and equal to or smaller than Y".

In the drawings below, members and portions eliciting identical effects are denoted by identical reference symbols, and a recurrent explanation thereof may be omitted or simplified. The reference symbols U, D, F, Rr, L and R in the figures denote up (top), down (bottom), front, rear, left and right, respectively. The reference symbols X, Y and Z in the figures denote respectively an array direction, a width direction and a height direction of unit cells. In the present embodiment, the array direction X, the width direction Y and the height direction Z are orthogonal to each other. The array direction X matches the front-rear direction, the width direction Y matches the winding axis direction of a flat wound electrode body, and the height direction Z matches a major axis direction of a cross-section of the flat wound electrode body and a vertical direction. The foregoing are merely directions for convenience of explanation, and the manner in which the assembled battery is disposed, used and so forth is not limited to these directions.

Assembled Battery

FIG. 1 is a perspective-view diagram illustrating schematically an assembled battery 1 according to an embodiment. The assembled battery 1 is provided with a plurality of unit cells 10, a plurality of spacers 40, a pair of end plates 50A, 50B, and a plurality of restraint bands 52. The unit cells 10 have a flat rectangular parallelepiped shape. The plurality of unit cells 10 is arrayed along the array direction X such that long side surfaces 30L (see FIG. 2) are perpendicular to the array direction X. The plurality of spacers 40 is disposed between the plurality of unit cells 10, and at front F and rear Rr ends of the unit cells 10 in the array direction X, so as to abut respective long side surfaces 30L of the unit cells 10. The end plates 50A, 50B are disposed sandwiching the assembled battery 1 and the spacers 40 at the front F and rear Rr, in the predetermined array direction X. The restraint bands 52 are C-shaped jigs in a plan view. The restraint bands 52 are spanned so as to lock the end plates 50A, 50B from the front F and the rear Rr, in such a manner that the array of the unit cells 10, the spacers 40 and the end plates 50A, 50B does not recover in a tension direction due to reaction forces, in a state where the unit cells 10, the spacers 40 and the end plates 50A, 50B are compressed in the array direction X at a predetermined stress.

The restraint bands 52 are fixed to the end plates 50A, 50B by a plurality of screws 54. The plurality of restraint bands 52 is disposed so as to preserve a restraining pressure that is exerted so as to compress the unit cells 10, the spacers 40 and the end plates 50A, 50B, along the array direction X. The compressive load by the plurality of restraint bands 52 that is exerted for instance in the array direction X of the unit cells 10 can be set to about 20 to 2000 kgf, and typically to about 20 to 1000 kgf. Therefore, the length in the array direction X is designed so that compressive stress is about 0.2 to 25 kgf/cm$^2$, for instance about 0.2 to 15 kgf/cm$^2$, as a surface pressure (average surface pressure exerted on the long side surfaces 30L). Although not specifically illustrated, screws may be inserted at any position between the pair of end plates 50A, 50B in order to finely adjust the restraining pressure. As a result, a predetermined compressive stress inherently acts, in the array direction X, on the plurality of unit cells 10 and the plurality of spacers 40 in the assembled battery 1. The end plates 50A, 50B, the plurality of restraint bands 52 and the plurality of screws 54 in the present embodiment are examples of a restraining member. However, the restraining member is not limited thereto.

Figure 2:
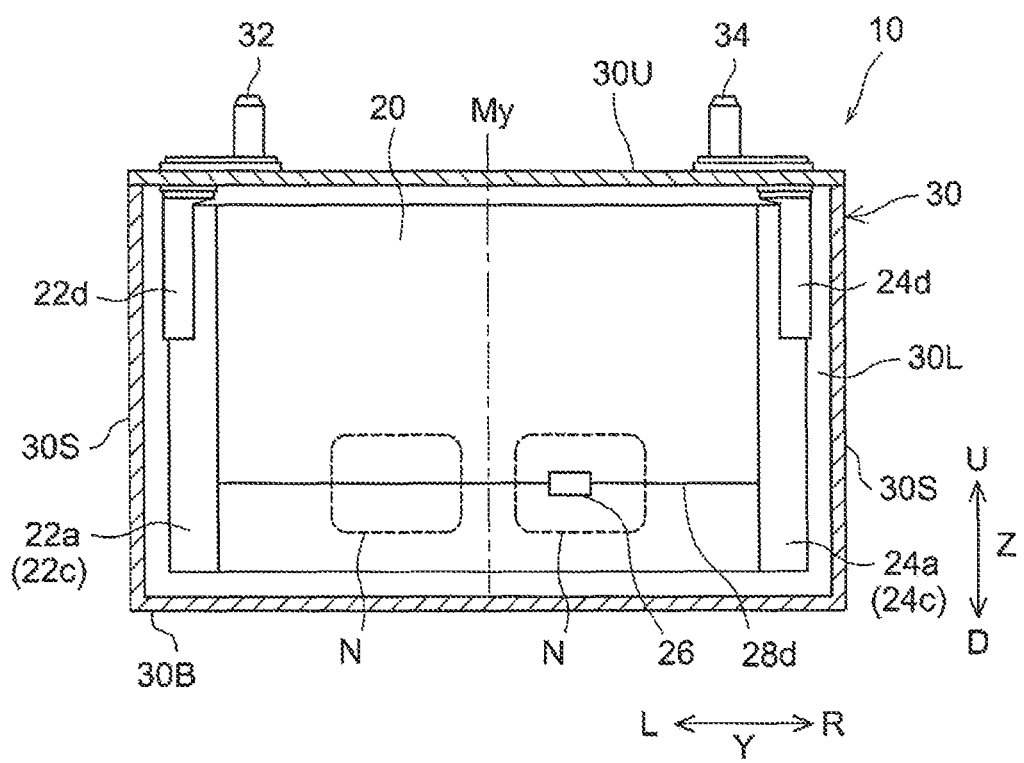
FIG. 2 is a cross-sectional diagram illustrating schematically a unit cell depicted in FIG. 1.
Figure 3:
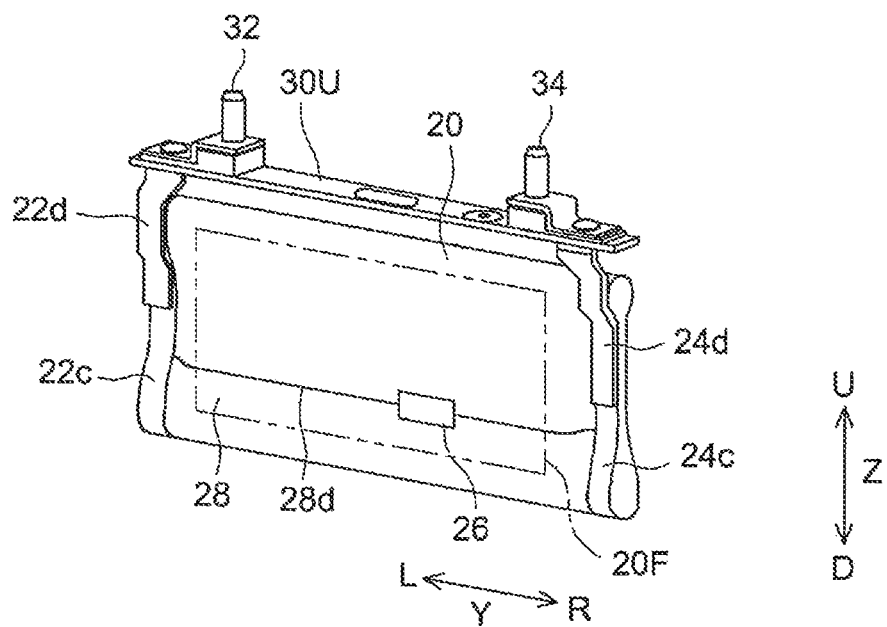
FIG. 3 is a main-section perspective-view diagram of the unit cell illustrated in FIG. 1.

FIG. 2 is a cross-sectional diagram illustrating schematically a unit cell 10 viewed in the array direction X. FIG. 3 is a main-section perspective-view diagram illustrating schematically a main section of the unit cells 10. The unit cells 10 are typically secondary batteries capable of being charged and discharged repeatedly. For instance, the unit cells 10 are lithium ion secondary batteries, nickel-hydride batteries, electrical double layer capacitors or the like. The unit cells 10 are provided with a flat wound electrode body (hereafter also referred to as "electrode body") 20, a non-aqueous electrolyte solution, not shown, and a battery case 30. An example of a lithium ion secondary battery will be explained below.

The battery case 30 is a housing that accommodates an electrode body 20 and an electrolyte solution, in a sealed state. The battery case 30 is metallic and is for instance made up of aluminum, iron or alloys of the foregoing. The outer shape of the battery case 30 of the present embodiment is a rectangular parallelepiped.

The battery case 30 has an upper surface 30U, a bottom surface 30B opposing the upper surface 30U, and a pair of long side surfaces 30L and a pair of short side surfaces 30S, as side surfaces contiguous to the bottom surface 30B. The bottom surface 30B of the battery case 30 of the present embodiment is an elongated rectangle longer in the width direction Y. The bottom surface 30B, the pair of long side surfaces 30L and the pair of short side surfaces 30S, make up for instance a battery case body having a bottomed square tube shape, for instance formed through drawing of one metal plate. The dimension of the battery case body is adjusted to a size such that the electrode body 20 described below can be substantially accommodated in the battery case body with little dead space. The pair of long side surfaces 30L and the pair of short side surfaces 30S are each made up of generally flat planes. The long side surfaces 30L may for instance be deformed through pressing by below-described rib portions 44 of the spacers 40. The average thickness (plate thickness) of the flat portions of the long side surfaces 30L and of the short side surface 30S is about 1 mm or smaller, typically 0.5 mm or smaller, for instance 0.3 to 0.5 mm, and about 0.4 mm as an example. The long side surfaces 30L of each battery case 30 abut respective spacers 40. It suffices herein that the battery case 30 be provided with a pair of side surfaces (long side surfaces 30L) that abut respective spacers 40, and the shape features of the battery case 30 are not particularly limited.

The upper surface 30U of the battery case 30 is a lid body that seals the battery case body hermetically. A filling port (not shown) that is used for injecting the electrolyte solution is provided in the upper surface 30U. A positive electrode terminal 32 and a negative electrode terminal 34 for external connection are disposed protrusively in the upper surface 30U. The positive electrode terminals 32 and the negative electrode terminals 34 of adjacent unit cells 10 are electrically connected by bus bars 12. The assembled battery 1 becomes electrically connected in series as a result. The size, number, arrangement, connection method and so forth of the unit cells 10 that make up the assembled battery 1 are not limited to those disclosed herein, and may accommodate variations as appropriate.

The nonaqueous electrolyte solution is accommodated in the battery case 30. The configuration of the nonaqueous electrolyte solution may be similar to that of conventional electrolyte solutions, and is not particularly limited. The nonaqueous electrolyte solution typically contains a non-aqueous solvent and a supporting salt. The nonaqueous solvent is typically for instance a carbonate such as ethylene carbonate (EC), dimethyl carbonate (DMC), ethyl methyl carbonate (EMC), or a mixed solvent of the foregoing. The supporting salt is typically a lithium salt such as for instance $LiPF_6$, $LiBF_4$ or the like.

Figure 4:
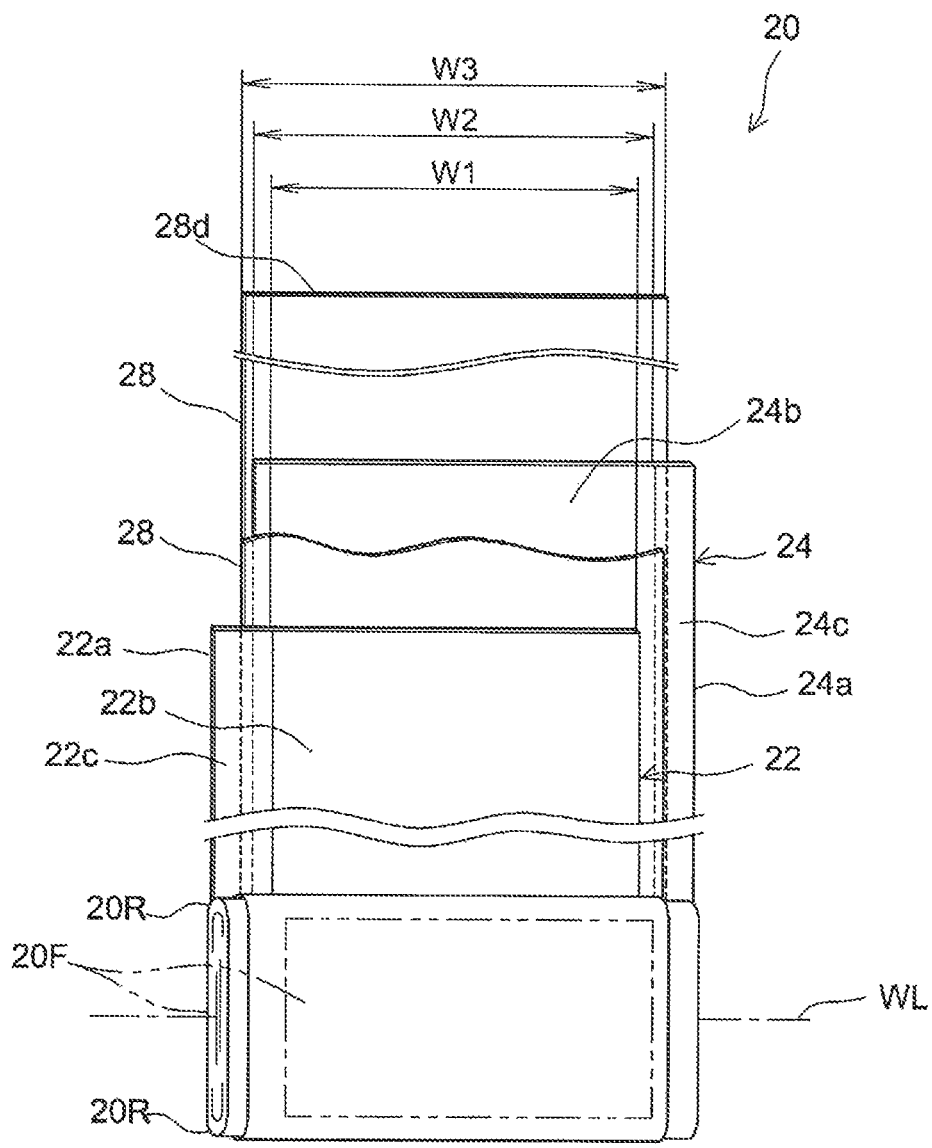
FIG. 4 is an exploded-view diagram for explaining schematically the configuration of a flat wound electrode body.

FIG. 4 is an exploded-view diagram for explaining schematically the configuration of the flat wound electrode body 20.

The electrode body 20 is provided with an elongate positive electrode 22, an elongate negative electrode 24 and a fixing member 26. The positive electrode 22 and the negative electrode 24 are stacked while insulated by two elongate separators 28. Positive and negative active material layers 22b, 24b are fixed to both faces of elongate collector sheets 22a, 24a of the positive electrode 22 and the negative electrode 24. The collector sheets 22a, 24a are sheets made of a metal having good electrical conductivity. For instance the positive electrode collector sheet 22a is an aluminum foil, and the negative electrode collector sheet 24a is a copper foil. The positive electrode active material layer 22b contains a positive electrode active material, for instance a lithium-transition metal complex oxide, capable of reversibly storing and releasing charge carriers. The negative electrode active material layer 24b contains a negative electrode active material, for instance a carbon material, capable of reversibly storing and releasing charge carriers. The composition of the active materials is not limited thereto, but the effect of the disclosure of the present application can be brought out in a particularly distinctive manner in unit cells 10 where the charge carrier is lithium ions and the negative electrode is made up of a carbon material. The positive and negative active material layers 22b, 24b may for instance contain a binder that binds together particulate active materials. The positive and negative active material layers 22b, 24b have a porous structure such that the layers can be impregnated with the nonaqueous electrolyte solution. The separators 28 let charge carriers through, and insulate the positive electrode active material layer 22b and the negative electrode active material layer 24b from each other. The separators 28 can be porous resin sheets, for instance polyolefin resin-made sheets of polyethylene (PE), polypropylene (PP) or the like, and stacks of the foregoing. The thickness of the separators 28 is not particularly limited but, as an example, is about 1 to 40 μm, typically about 5 to 30 μm, and for instance 10 to 30 μm.

Collector portions 22c, 24c having no active material layers 22b, 24b disposed thereon are provided, along the longitudinal direction, at respective first ends of the collector sheets 22a, 24a in the transverse direction, i.e. the width direction, perpendicular to the longitudinal direction. The width direction of the positive electrode 22, the negative electrode 24 and the separators 28 matches the width direction Y of the unit cells 10 and of the electrode body 20. The width W2 of the negative electrode active material layer 24b in the width direction Y of the electrode body 20 is greater than the width W1 of the positive electrode active material layer 22b; the negative electrode active material layer 24b protrudes thus from the positive electrode active material layer 22b at both ends in the width direction Y. The width W3 of the separators 28 is greater than the width W2 of the negative electrode active material layer 24b; the separators 28 protrude thus from the negative electrode active material layer 24b at both ends in the width direction Y. Specifically, W1, W2 and W3 satisfy the relationship W1<W2<W3. The positive electrode 22 and the negative electrode 24 are stacked so that the collector portions 22c, 24c are disposed on mutually opposite sides in the width direction Y. The edges of the collector portions 22c, 24c protrude beyond the separators 28 at respective ends in the width direction Y. The positive electrode active material layer 22b and the negative electrode active material layer 24b oppose each other in a state of being insulated from each other, over an area of width W1 of the positive electrode active material layer 22b.

The positive and negative electrodes 22, 24 are wound about a winding axis WL being herein the width direction Y, to yield an oval cross-sectional shape. The oval shape denotes substantially herein a shape such that between two semi-circles, each resulting from cutting a circle along an arbitrary diameter, there is inserted a rectangle having one pair of opposing sides that match the diameters of the semi-circles. Herein R portions 20R denote those portions of the flat wound electrode body 20 corresponding to the width W1 at which the positive electrode active material layer 22b is provided, i.e. correspond to the above semicircular arcs in a sectional view, while flat portions 20F denote portions corresponding to the above rectangle. The sectional diameter is referred to as a minor axis, and the dimension of the oval shape in a direction perpendicular to the sectional diameter is referred to as a major axis. The R portions 20R and the flat portion 20F need not form strict semicircular arcs and flat planes in geometrical terms. In the electrode body 20, the separators 28 are longer than the positive electrode 22 and the negative electrode 24, such that, at the winding end, only the separators 28 are wound around the outer periphery of the electrode body 20 by at least one turn. The edge 28d at the winding end of the separators 28 is fixed to the separators 28 on the inner peripheral side, over one turn, by the fixing member 26. The fixing member 26 is for instance an adhesive tape having a total thickness of about 30 to 70 μm (for instance about 55 μm) made up of a tape base material about 15 to 45 μm thick (for instance about 30 μm thick) and having polyphenylene sulfide as a main component, and a pressure-sensitive adhesive layer about 15 to 40 μm thick (for instance about 25 μm thick) and having butyl acrylate as a main component. For instance an adhesive tape of large total thickness may be used in order to allow bringing out a high affixing force in a small surface area. The wound structure of the electrode body 20 and the configuration of the fixing member 26 are however not limited thereto. The fixing position of the fixing member 26 will be explained in detail further on.

In the example of FIG. 3 the positive electrode collector portion 22c is disposed spirally on the left L of the electrode body 20 in the width direction Y. The positive electrode collector portion 22c is brought together in the front-rear direction X, and is welded to a positive electrode collector plate 22d for power collection. The positive electrode 22 of the electrode body 20 is electrically connected to the positive electrode terminal 32 via the positive electrode collector plate 22d. The negative electrode collector portion 24c is spirally disposed on the right R of the electrode body 20 in the width direction Y. The negative electrode collector portion 24c is brought together in the front-rear direction X, and is welded to a negative electrode collector plate 24d for power collection. The negative electrode 24 of the electrode body 20 is electrically connected to the negative electrode terminal 34 via the negative electrode collector plate 24d. The shape of the positive electrode collector plate 22d and of the negative electrode collector plate 24d is adjusted so that the long axis of the electrode body 20 matches the height direction Z of the battery case 30; herein, the positive electrode collector plate 22d and the negative electrode collector plate 24d are mechanically fixed to the upper surface 30U via the collector plates 22d, 24d.

In the unit cells 10, the flat portions 20F of the electrode body 20 are disposed opposing respective long side surfaces 30L of the battery case 30. In other words, the electrode surface of each flat portion 20F of the electrode body 20 is disposed along the array direction X. One of the R portions 20R of the pair thereof in the electrode body 20 is disposed opposing the upper surface 30U of the battery case 30, while the other R portion 20R is disposed opposing the bottom surface 30B. In other words, one of the R portions 20R is disposed upward U of the flat portion 20F, while the other R portion 20R is disposed downward D of the flat portion 20F. In other words, the pair of wound R portions 20R of the electrode body 20 is disposed up and down in the vertical direction Z. The pair of edges of the electrode body 20 in the width direction Y is disposed so as to oppose the pair of short side surfaces 30S of the battery case 30. The electrode body 20 is closed off so that, while being substantially open in the winding axis direction Y, in the state of a single unit cell 10 the electrolyte solution may not move, on account of the collectors 22a, 24a, in a direction intersecting the winding axis WL.

In the present embodiment, charge and discharge reactions (electrochemical reactions) take place mainly in the flat portions 20F corresponding to the width W1 of the positive electrode active material layer 22b of the electrode body 20. The positive electrode active material layer 22b of the positive electrode 22 and the negative electrode active material layer 24b of the negative electrode 24 are disposed opposing each other in the array direction X, across the separators 28, at the flat portion 20F.

Figure 5:
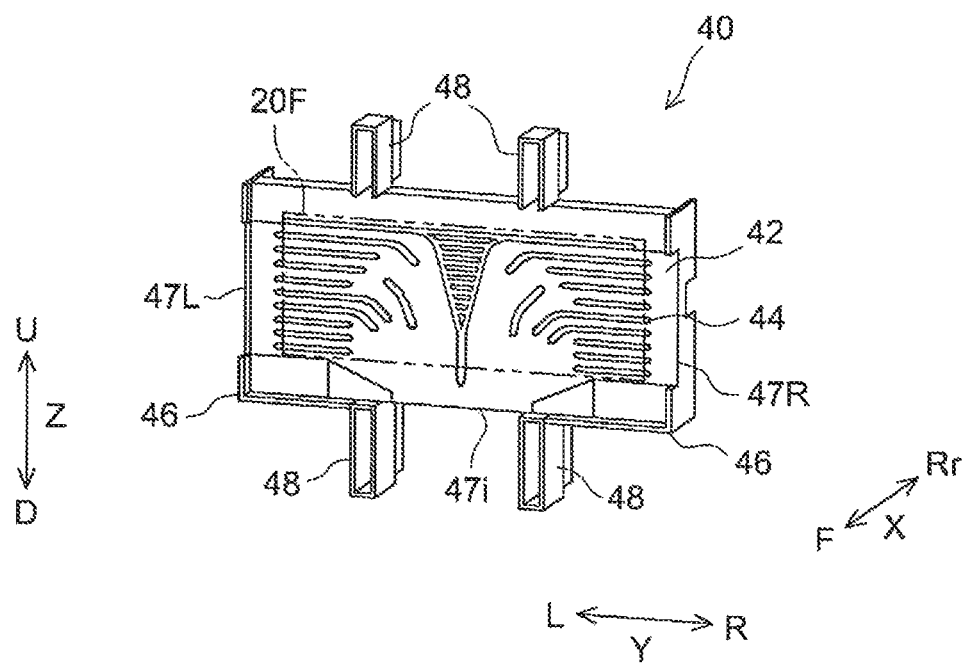
FIG. 5 is a perspective-view diagram illustrating schematically a spacer according to an embodiment.
Figure 6:
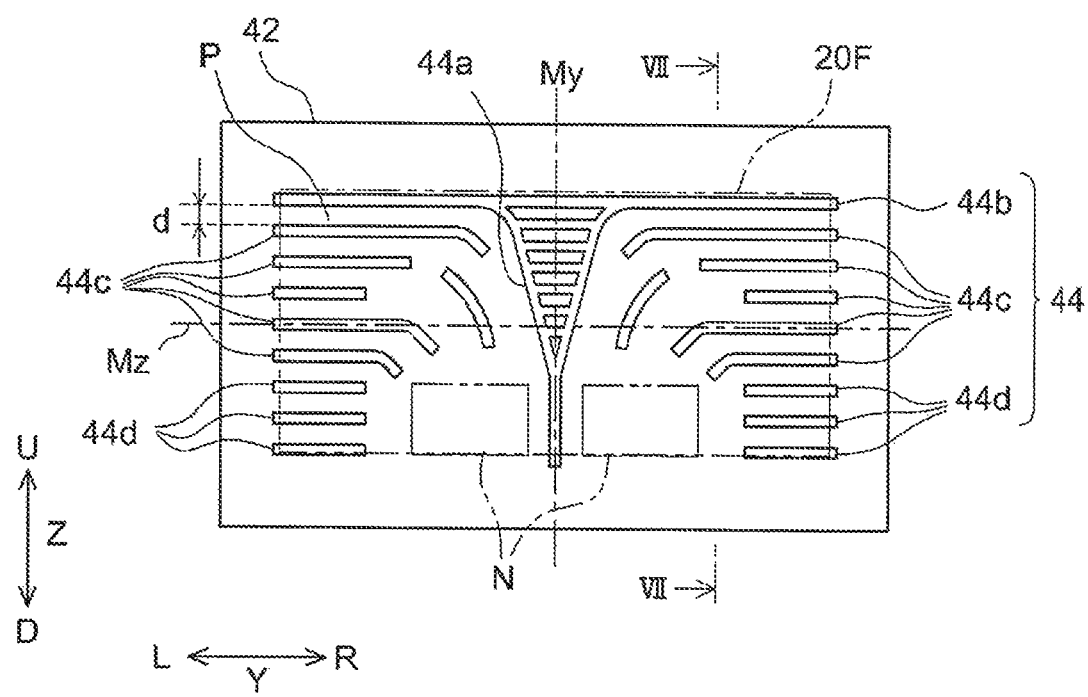
FIG. 6 is a main section front-view diagram of the spacer illustrated in FIG. 5.
Figure 7:
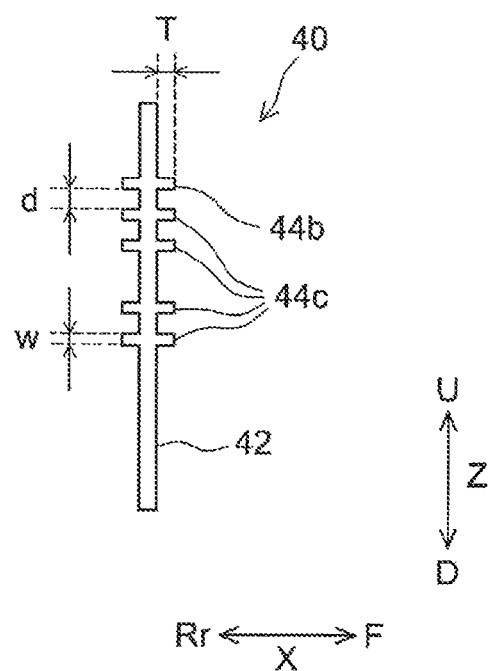
FIG. 7 is a cross-sectional diagram of FIG. 6 along line VII-VII.
Figure 8:
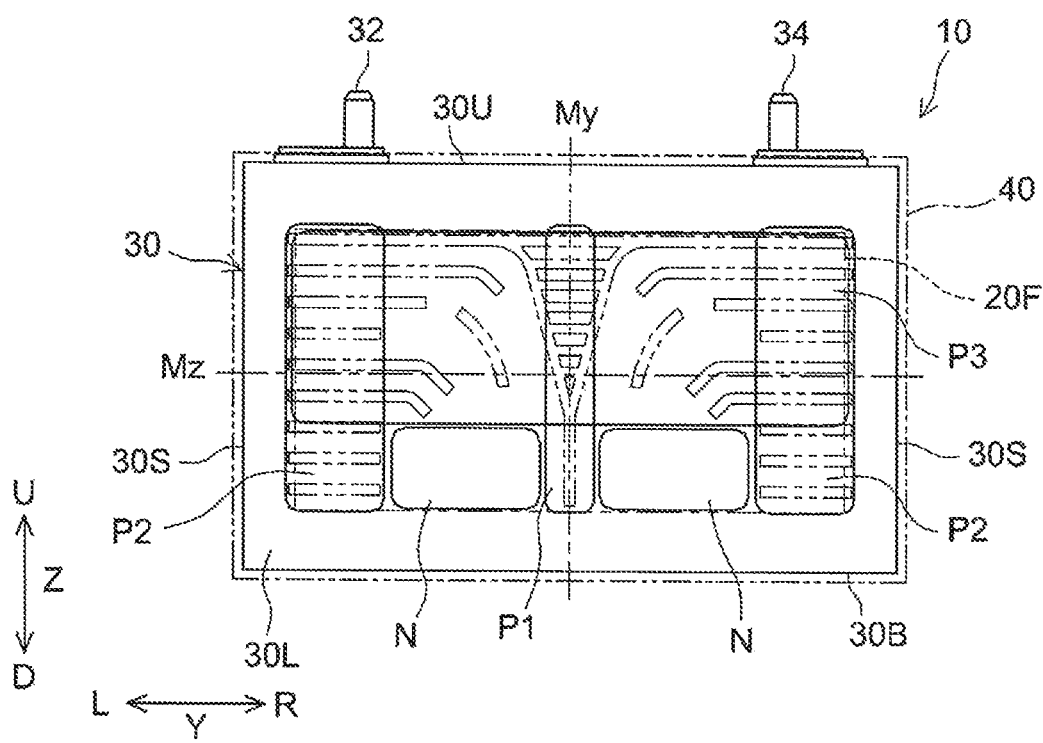
FIG. 8 is a front-view diagram illustrating schematically a relative positional relationship between a unit cell and a spacer main section.

FIG. 5 is a perspective-view diagram illustrating schematically a spacer 40 according to the present embodiment. FIG. 6 is a plan-view diagram illustrating schematically a main section of the spacer 40. FIG. 7 is a cross-sectional diagram of the main section of the spacer 40 along line VII-VII. FIG. 8 is a front-view diagram illustrating schematically a relative positional relationship of the spacer 40 with respect to a unit cell 10 during array. FIGS. 5, 6 and 8 depict with imaginary lines the arrangement of a flat portion 20F in the array direction X, in the electrode body 20 accommodated in each unit cell 10.

The spacers 40 are disposed so as to abut respective long side surfaces 30L of the unit cells 10, and have the function of effectively dumping heat generated inside the unit cells 10 into the spaces between the unit cells 10. The spacers 40 are made up for instance of a resin material such as polypropylene (PP) or polyphenylene sulfide (PPS), or a metallic material having good thermal conductivity. Each spacer 40 is provided with a base portion 42, rib portions 44, a frame portion 46 and support portions 48. The support portions 48 are members that support the base portion 42. During construction of the assembled battery 1, the support portions 48 secure a space into which there is fed a cooling fluid downward D in the assembled battery 1, and secure a safety space for preventing for instance the positive and negative electrode terminals 32, 34 and so forth from coming into contact with other members, upward U in the assembled battery 1. The spacer 40 of FIG. 1 is an example of a form in which no support portions 48 are provided.

The base portion 42 is the main member of the spacer 40. As illustrated in FIG. 8, the shape of the base portion 42 corresponds to the shape of the long side surfaces 30L of the battery case 30 of the unit cells 10. The frame portion 46 protrudes in the form of a frame in the array direction X, at the outer edge of the base portion 42. The protruding dimension (dimension in the array direction X) of the frame portion 46 can be set to be higher than the protruding dimension T of the rib portions 44 described below. The protruding dimension of the frame portion 46 is for instance (protruding dimension T of the rib portions 44+1 to 3) mm. The frame portion 46 is provided in the form of a continuous wall from the upper U ends of the long side surfaces 30L over to the left L corner and right R corner. The frame portion 46 is also provided in the form of two walls spaced apart from each other, at the bottom D left L corner and the bottom D right R corner of each long side surface 30L. The inner dimension of the region surrounded by the frame portion 46 matches the dimension of the long side surfaces 30L of the unit cells 10. Therefore, the spacers 40 and the unit cells 10 are thus properly positioned through fitting of the unit cells 10 to the spacers 40 in such a manner that respective long side surfaces 30L and respective base portions 42 face each other. A respective cooling space for introduction of a cooling fluid is formed in the space surrounded by each base portion 42, each frame portion 46 and each long side surface 30L. An opening 47i is provided in the central portion of the bottom D frame portion 46 in the width direction Y. Openings 47L, 47R are provided on the left L and right R, between the top U and bottom D of the frame portion 46. The opening 47i functions as an inflow port through which the cooling fluid is allowed to flow into the cooling space from outside. The openings 47L, 47R function as outflow ports through which the cooling fluid is allowed to flow from the cooling space towards the exterior.

The spacer 40 has formed therein a plurality of rib portions 44 integrated with the base portion 42. The rib portions 44 are provided so as to protrude from the base portion 42 in the array direction X. The rib portions 44 are provided in both faces of the base portion 42, i.e. on the front F face and the rear Rr face in the array direction X. The rib portions 44 protrude by an identical protruding dimension (height) T, except at the ends. The rib portions 44 are for instance wall shapes erected on the base portion 42, in linear fashion in a front view. As a result, the rib portions 44 function as flow channel walls that regulate the flow of the cooling fluid in the cooling space. The rib portions 44 typically guide the cooling fluid so as to move through the opening 47i towards the opening 47L or 47R. Although not particularly limited thereto, the height T of the rib portions 44 is typically equal to or smaller than the thickness (dimension in the array direction X) of the base portion 42, and is for example 2 mm or smaller, typically 1 mm or smaller, and is for instance 0.5 to 1 mm. The width W of the rib portions 44 in a front view is typically equal to or smaller than the thickness of the base portion 42, for example 3 mm or smaller, typically 2 mm or smaller, and is for instance 0.5 to 1 mm.

The rib portions 44 protrude towards the long side surfaces 30L of the unit cells 10 in the assembled battery 1. In the assembled battery 1, compressive stress is inherently present in the array direction X, and accordingly the rib portions 44 press directly against the long side surfaces 30L.

Figure 9A:
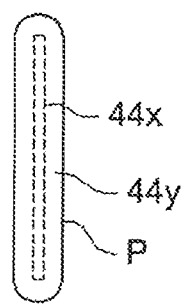
FIG. 9A is a diagram illustrating schematically a relative relationship between a rib portion of a spacer and a pressing region of a flat wound electrode body.
Figure 9B:
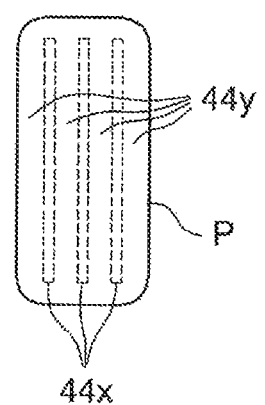
FIG. 9B is a diagram illustrating schematically a relative relationship between a rib portion of a spacer and a pressing region of a flat wound electrode body.

The long side surfaces 30L of the battery case 30 abut the flat portions 20F of the electrode body 20, and accordingly the rib portions 44 press the flat portions 20F via the long side surfaces 30L. The rib portions 44 function also as a pressing member that presses the flat portions 20F of the electrode body 20. The long side surfaces 30L are plate-shaped, and accordingly also the peripheral portions of the long side surfaces 30L flex towards the interior of the battery case 30, besides the portion at which the rib portions 44 abut the long side surfaces 30L. As a result a pressing force acts, in each flat portion 20F, on peripheral portions 44y, in addition to rib-corresponding portions 44x that correspond to the front-view shape of the rib portions 44, as illustrated in FIG. 9A. In consequence, a pressing force (compressive stress) acts at a respective pressing region P made up of the rib-corresponding portions 44x and the peripheral portions 44y, in the flat portion 20F. As illustrated in FIG. 9B, when the rib portions 44 are provided at a relatively close distance in the spacer 40, the peripheral portions 44y formed on the periphery of the rib-corresponding portions 44x are integrated on the basis of the rib portions 44, and the pressing region P is formed in a wide area. Therefore, the flat portions 20F can be pressed at a wide pressing region P, by providing thus a plurality of linear rib portions 44 spaced from each other in the spacer 40. The shape, size, number and arrangement of the rib portions 44 can be determined as appropriate for instance depending on the required battery characteristics.

FIGS. 6 and 7 illustrate only the base portion 42 and the rib portions 44 of the spacer 40, for convenience. The rib portions 44 are substantially provided at a position corresponding to the flat portion 20F of the electrode body 20, in a front view of the base portion 42. The rib portions 44 are disposed so that the left L and right R thereof are line symmetrical with respect to a center line My, as a symmetry axis, corresponding to the center of each flat portion 20F in the width direction Y. The rib portions 44 in the present embodiment include four types of ribs 44a, 44b, 44c, 44d having different shapes and sizes. The ribs 44a, 44b, 44c, 44d are disposed overall is a ribbed pattern. The ribs 44b, 44c, 44d are disposed the form of ridges.

The ribs 44a are disposed along the vertical direction Z, in a portion including the center line My. The ribs 44a are configured mainly so as to divide, towards the left L and right R of the cooling space, the cooling fluid introduced into the cooling space from the bottom D of the assembled battery 1, through the opening 47i. The ribs 44a are configured so as to press the central region of the electrode body 20 including the center of the flat portions 20F in the width direction Y.

The ribs 44c, 44d are each configured in the form of multiple ribs disposed spaced apart from each other. The ribs 44c, 44d are respectively disposed at positions corresponding to edges on the left L and right R of the flat portion 20F in the width direction Y, and each includes a linear portion along the width direction Y. The linear portions of the ribs 44c, 44d are disposed equidistantly in the vertical direction Z. In other words, the multiple ribs 44c, 44d are formed at a predetermined pitch d in the vertical direction Z.

The ribs 44c are disposed relatively upward U of the ribs 44d. Although not limited thereto, the ribs 44c are provided for instance at an upper U portion spanning over ⅔ from the upper end to the lower end of the flat portion 20F, in the vertical direction Z. The ribs 44c are provided for instance also at a central portion of the flat portion that includes in the center line Mz being the center of the flat portion 20F in the vertical direction Z. The ribs 44c may be provided over the entirety of the upper U portion, or may be provided in just part of the upper U portion. The linear portion of the ribs 44c may be formed extending over respectively different lengths towards the center line My. The ribs 44c may each include, at a side closer to the center line My than the edges, drooping portions that droop downward D towards the center line My. The drooping portions may be formed contiguously to respective linear portions, or may be formed as extensions of the linear portions but spaced therefrom.

The ribs 44d, meanwhile, are disposed relatively downward D of the ribs 44c. The ribs 44d are provided for instance at a lower D portion spanning ⅓ from the lower end to the upper end of the flat portion 20F, in the vertical direction Z. The ribs 44d are disposed on edges on the left L and right R of the flat portion 20F in the width direction Y, and are made up of only linear portions. The ribs 44d are all formed over a substantially identical length, at positions corresponding to the edges. The ribs 44d may be shorter than the ribs 44c in the width direction Y.

The ribs 44c, 44d are configured so that cooling fluid that is split to the left L and right R by the ribs 44a moves smoothly towards the opening 47L or 47R. The ribs 44c, 44d function as flow channel walls for allowing cooling fluid that is split to the left L and right R by the ribs 44a to move smoothly towards the opening 47L or 47R. Grooves that can be used as flow channels of cooling fluid are formed between the ribs 44a, 44b, 44c, 44d. The width of the grooves formed between the ribs 44c, 44d match for instance a pitch d.

The rib 44b includes a linear portion in the width direction Y, at a position corresponding to the upper U edge of the flat portion 20F. The rib 44b is provided over the total length of the flat portion 20F in the width direction Y. The rib 44b makes up a T-shape by being connected to the ribs 44a in the vicinity of the center line My. The rib 44b is curved smoothly, in a front view, at the connecting section with the ribs 44a. In other words, the rib 44b includes drooping portions that droop downward D with decreasing distance to the center line My, on the side closer to the center line My, the drooping portions being connected to the ribs 44a. As a result it becomes possible to prevent the cooling fluid, which is introduced into the cooling space via the opening 47i, from raising and hitting the rib 44b, and from flowing back by bouncing off the rib 44b. The cooling fluid introduced into the cooling space via the opening 47i moves smoothly towards the opening 47L or 47R thanks to the drooping portions and the linear portion of the rib 44b. The rib 44b functions as a flow channel wall for allowing cooling fluid having been split to the left L and right R by the ribs 44a to move smoothly towards the opening 47L or 47R. Although not necessarily limited thereto, the rib 44b can be provided also within a region surrounded by the ribs 44a and the drooping portions of the ribs 44c.

The ribs 44a include a center of each flat portion 20F of the electrode body 20 in the width direction Y, and form a first pressing region P1 that presses the flat portion 20F over the total length in the vertical direction Z. The ribs 44b, 44c, 44d jointly form, in the flat portion 20F, second pressing regions P2 that press the flat portion 20F over the total length in the vertical direction Z, at the edges on the left L and right R, in the width direction Y. The ribs 44a, 44b, 44c form jointly, in the flat portion 20F, a third pressing region P3 that presses the top U of the flat portion 20F over the total length thereof in the width direction Y. In the flat portion 20F there is formed thus an E-shaped pressing region P by the first pressing region P1, the second pressing regions P2 and the third pressing region P3. In conjunction with this, a moderation region N other than the pressing region P is formed in the flat portion 20F. The moderation region N is provided at regions spaced from the center line My being the center of the flat portion 20F in the width direction Y. The moderation region N is provided at regions spaced from both ends on the left L and right R, of the flat portion 20F in the width direction Y. In the present example the moderation region N is provided on a bottom D region of the flat portion 20F in the vertical direction Z. The moderation region N is provided split at two sites in the flat portion 20F. The moderation region N is a region at which the pressing force by the ribs 44a, 44b, 44c, 44d is not applied as intensely as in the pressing region P. In other words, the rib portions 44 are not provided at the base portion 42 of the spacer 40 corresponding to the moderation region N.

The language "rib portions 44 are not provided" signifies that the rib portions 44 are not provided in a wide region at a predetermined position corresponding to the base portion 42. Although not strictly prescribed, for instance the pitch d of the ribs 44b, 44c, 44d is typically 1 to 10 mm, for instance 5 to 10 mm, and accordingly an instance where the rib portions 44 are not provided in an arbitrary region that exceeds 10 mm square (for instance a 12 mm square region) can be construed as a region "in which the rib portions 44 are not provided". In the pressing region P, for instance, the surface area of the rib portions 44 per 10 mm square in the base portion 42 corresponding to the spacer 40 can be typically 1% to 50%, and for instance 5% to 30%. It is found that as a result the surface pressure at the moderation region N acts only over 50% or less, for instance over about 0.1% to 40%, of the maximum surface pressure (maximum pressing force per unit surface area) at the pressing region P. The surface area balance and arrangement of the pressing region P and the moderation region N can be designed according to a relative relationship with the spacer 40, and can be designed in accordance with the characteristics required by the battery.

Compressive stress can be applied efficiently over the entirety of the flat portion 20F by virtue of the fact that the ribs 44a are provided over the total length of the flat portion 20F in the vertical direction Z, at a position corresponding to the center line My of the flat portion 20F. Moreover, the flat portion 20F can be pressed uniformly, in the vertical direction Z. Further, compressive stress by the ribs 44a can be exerted more uniformly to the flat portion 20F, in the width direction Y, by virtue of the fact that the rib 44b is formed over of the total length in the width direction Y. The homogeneity of compressive stress exerted onto the flat portion 20F is further increased overall by virtue of the fact that the ribs 44a and the rib 44b are formed integrally with each other. Further, the ribs 44b, 44c, 44d jointly press both ends of the flat portion 20F in the width direction Y over the total length along the vertical direction Z. As a result it becomes possible to effectively increase the homogeneity, in the vertical direction Z, of the compressive stress that acts on the flat portion 20F. For instance the homogeneity, in the width direction Y, of the compressive stress acting on the flat portion 20F can also be effectively increased, even when reducing the dimension of the ribs 44a in the width direction Y. This is useful in terms of enlarging the contact area between the cooling fluid and the long side surfaces 30L in the vicinity of the center of the flat portions 20F.

In the art disclosed herein the fixing member 26 that fixes the winding end of the flat wound electrode body 20 is disposed at the above moderation region N. For instance, the length of the separators 28 is adjusted in such a manner that the winding end edge 28d overlaps the moderation region N. The fixing member 26 is affixed to the electrode body 20 in such a way as to span the winding end edge 28d and the separators 28 on the inward side by one turn at a position, corresponding to the moderation region N, of the winding end edge 28d on the outermost periphery of the electrode body 20. As a result the winding end edge 28d becomes fixed to the separators 28, on the inside, by the fixing member 26.

The thickness of the electrode body 20 in the array direction X is locally greater at the position of the fixing member 26. When the fixing member 26 is disposed at the pressing region P, the electrode body 20 undergoes extra pressing, in proportion to the thickness of the fixing member 26, at the position where the fixing member 26 is affixed. The pressing force from the rib portions 44 acts on the pressing region P while somewhat dispersed up to the periphery on account of flexing of the long side surfaces 30L of the battery case 30. However, the increment in pressing force (surface pressure) by the fixing member 26 becomes localized, without dispersing. As a result, the inter-electrode distance between the positive electrode 22 and the negative electrode 24 is actively and locally shrunk at the affixing position of the fixing member 26. Such localized reduction in inter-electrode distance gives rise for instance to localized concentration of charge and discharge currents; this is problematic in that, as a result, charge carriers precipitate readily at the surface, of the negative electrode, corresponding to such sites. By contrast, the pressing force by the rib portions 44 is sufficiently smaller at the moderation region N than at the pressing region P. Therefore, the increase in pressing force (surface pressure) that accompanies an increase in the thickness of the fixing member 26 can be mitigated by arranging the fixing member 26 at the moderation region N. Arranging thus the fixing member 26 of the moderation region N allows using for instance, as the fixing member 26, a thicker adhesive tape having a higher adhesive force (fixation force) over a smaller surface area, without giving rise to electrodeposition. This allows supplying the occurrence of electrodeposition at the flat portions 20F that constituting a reaction region of the electrode body 20. Suppression of electrodeposition is important in terms of improving capacity characteristics and safety during repeated charging and discharging of the assembled battery 1 over long periods of time.

As an example, when the fixing member 26 is not disposed at the pressing region P, the difference in center-to-center distance (inter-electrode distance) of the positive electrode collector and the negative electrode collector in the thickness direction, between the affixing position of the fixing member 26 and a position spaced by 100 μm from the edge of the fixing member 26, is about 2.5 μm; in that case no charge carrier precipitation (metal lithium precipitation) is observed at either position. When by contrast the fixing member 26 is disposed at the pressing region P, it is found that the difference in inter-electrode distance, between the affixing position of the fixing member 26 and a position spaced by 100 μm from the edge of the fixing member 26, increases approximately three-fold, up to about 7.3 μm, with the inter-electrode distance at the affixing position becoming locally smaller. It is found that as a result electrodeposition occurs significantly at the negative electrode surface on the outermost periphery, in the affixing position.

For instance in a lithium ion battery that utilizes a graphite material having low operating potential, namely 0.1 V (vs Li$^+$/Li) referred to lithium, small fluctuations in the surface potential of the electrodes cause lithium, being the charge carrier, to precipitate (undergo electrodeposition) readily on the surface of the negative electrode during charging. The configuration disclosed herein is accordingly useful on account of the pronounced electrodeposition suppression effect afforded thereby. The readiness with which such electrodeposition occurs is significant during charging and discharging (in particular charging) under conditions of sluggish movement of charge carriers in the electrode active material, for instance in low-temperature environments and/or at high rates. In some embodiments, the above configuration is adopted, on account of the significant electrodeposition suppression effect afforded thereby, in an assembled battery 1 that is charged and discharged at low temperature and/or at a high rate.

Fixing of the winding end edge 28*d* by the fixing member 26 may conceivably be performed at the R portions of the electrode body 20. That is because the stacking direction of the electrodes in the R portions does not match the array direction X, and accordingly the negative electrode 24 is not excessively pressed locally by the fixing member 26, on account of the active pressing force of the rib portions 44, even when the fixing member 26 is disposed at the R portions. This ostensibly suggests that no adverse effect occurs of localized precipitation of charge carriers. However, the inter-electrode distance between the positive electrode 22 and the negative electrode 24 may increase gradually towards the outer periphery of the wound electrode body 20, at the R portions. Although the inter-electrode distance can be kept substantially identical to that of the flat portion 20F, also at the R portions made up of the pair of positive and negative electrodes, at the region adjacent to the flat portion 20F, the inter-electrode distance increases however gradually with increasing separation from the flat portion 20F. That is, the inter-electrode distance varies significantly, and the amount of variation of the inter-electrode distance is greater, at the outer periphery than on the inner periphery, even for a small curved surface dimension in the longitudinal direction, corresponding to one-layer R portions. In such an environment the potential difference between the positive and negative electrodes is not stable, and metal components contained in for instance the positive electrode active material can leach and become deposited on the surface the negative electrode. For instance it is found that when the fixing member 26 is disposed (affixed) on the outermost periphery of the R portions, there is significant precipitation of metals (for instance Mn, Co, Ni or the like) that make up the positive electrode active material, on the negative electrode surface at the outermost periphery; when the fixing member 26 is disposed (affixed) on the outermost periphery of the flat portion 20F, however, no precipitation of such metal components is observed. In some embodiments, the fixing member 26 is not disposed at the R portions of the electrode body 20. The configuration disclosed herein allows arranging the fixing member 26 at an optimal position, while keeping constant the inter-electrode distance at the flat portion 20F, also in an assembled battery 1 having inherent compressive stress derived from a restraining member.

In such an assembled battery 1, a predetermined restraining pressure of compressive character acts thus on the flat portion 20F at all times, in the array direction X. As a result the inter-electrode distance between the positive electrode 22 and the negative electrode 24 can be prevented from increasing, and the positional relationship between the positive electrode 22 and the negative electrode 24 in the array direction X can be maintained stably. For instance the internal resistance derived from the resistance to movement of charge carriers moving across the electrodes can be lowered by uniformly reducing the inter-electrode distance in the flat portion 20F.

Depending on the type of active material, there are known active materials (for instance graphite materials, silicon-based metallic materials and the like) having a significant degree of volume expansion and volume shrinkage associated with storage and release of charge carriers. The inter-electrode distance in an assembled battery 1 that utilizes such an active material is prone to increasing as the battery is used over long periods of time. The above configuration, however, allows maintaining good battery characteristics over long periods of time, by curtailing increases in inter-electrode distance. This is useful in terms of making it possible to suitably suppress increases in cycle resistance in an assembled battery 1 that is used for instance by being charged and discharged at a high rate.

In the present embodiment the rib portions 44 are provided so as to press the portion on both ends of the flat portion 20F of the electrode body 20 in the width direction Y. The second pressing regions P2 over the total length in the vertical direction Z are formed by a combination of the ribs 44*b*, 44*c*, 44*d* at this portion, on both ends in the width direction Y. The second pressing regions P2 provided in the portions on both ends in the width direction Y function as stopper walls for suppressing discharge of electrolyte solution from the electrode body 20 that is open in the width direction Y. This allows suitably storing the electrolyte solution in the interior of the electrode body 20, in the assembled battery 1. Therefore, it becomes possible to realize excellent high-rate cycle characteristics in the assembled battery 1, by making unlikelier pushing of the electrolyte solution out of the system of the electrode body 20 even during repeated charging and discharging at a high rate.

In the present embodiment, the dimension of the first pressing region P1 in the width direction Y can be set to be smaller than the dimension of the second pressing regions P2 in the width direction Y. The dimension of the ribs 44*a* in the width direction Y can be correspondingly set to be smaller than the dimension of the linear portions of the ribs 44*c*, 44*d* in the width direction Y. That is because in a case where the second pressing regions P2 are provided at both ends on the left L and right R, the flat portion 20F can be effectively pressed by designing the width of the second pressing regions P2 to be relatively large, even if the width of the first pressing region P1 is designed to be relatively small. A further reason is that the contact efficiency between the cooling fluid and the center of the electrode body 20, in which heat lingers readily, can be increased by reducing the dimension of the ribs 44*a* in the width direction Y. The dimension of the first pressing region P1 in the width direction Y is not limited thereto, and for instance a ratio of the dimension of the first pressing region P1 in the width direction Y with respect to the dimension of the second pressing regions P2 in the width direction Y may be set to be lower than 1, typically ¾ or lower, for instance ⅔ or lower, and further ½ or lower. Cooling properties and high-rate cycle characteristics can both be better improved as a result.

When in the present embodiment the pressing region P includes a third pressing region P3 spanning over the flat portion 20F in the width direction Y, the third pressing region P3 may be disposed within a ⅔ top U region in the vertical direction Z, when the assembled battery 1 is disposed so that the major axis of the electrode body 20 matches the vertical direction Z. In some embodiments, the rib portions 44 are disposed at least within the region corresponding to the ⅔ top U side of the flat portions 20F of the electrode body 20. For instance a central portion including the center line Mz being the center of the flat portions 20F in the vertical direction Z is a position at which changes in volume of the electrode body 20 accompanying charging and discharging are substantial, and at which the inter-electrode distance increases readily accompanying repeated charging and discharging. Therefore, the distance between the positive electrode 22 and the negative electrode 24 can be prevented from increasing, and the positional relationship of the positive electrode 22 and the negative electrode 24 in the array direction X can be maintained stably, by virtue of the fact that the third pressing region P3 is disposed so as to encompass the above central portion. This allows suppressing effectively changes in the volume of the electrode body 20, and swelling of the electrode body 20 caused by such volume changes. Increases in resistance can be suitably suppressed as a result, also for instance during high-rate charging and discharging. Further the degree of freedom in the design of for instance the drooping portions of the ribs 44c can be increased, and the cooling efficiency of the assembled battery 1 can be improved.

In some embodiments, the moderation region N is disposed at least at a ⅓ bottom D region of the flat portion 20F in the vertical direction Z. The rib portions 44 are provided so as not to press at least part of the ⅓ lower portion, from the lower end of the flat portion 20F of the electrode body 20 in the vertical direction Z. The electrolyte solution is likelier to be present at the moderation region N than in the pressing region P, due to pressing by the electrode body 20. The electrolyte solution moves readily downward D, by gravity, when the major axis of the electrode body 20 is disposed so as to match the vertical direction Z. Therefore, the electrolyte solution can be effectively held in the electrode body 20, by virtue of the fact that the moderation region N is disposed at the ⅓ bottom D region in the vertical direction Z. In a case where the pressing region P is disposed at the ⅓ bottom D region of the electrode body 20, the dimension of the pressing region P in the flat portion 20F, in the width direction Y, may be limited to be in total about ½ (50%) or less. In some embodiments, the dimension of the pressing region P in the ⅓ bottom D region, in the width direction Y, is ⅓ or less, and may be ¼ or less. As a result liquid retention of the electrode body 20 is increased, and the high-rate cycle characteristic can be better improved.

In some embodiments, the rib portions 44 are not provided at the bottom D of the spacer 40, since in that case it becomes possible to suppress blocking of inflow of cooling fluid through the opening 47i, and to promote smooth introduction of the cooling fluid. As illustrated in FIG. 5, mutually opposing surfaces of one frame portion 46 disposed at the left L end and the right R end, at the bottom D of the base portion 42, are tilted such that the distance therebetween increases upward U. In other words, the opening 47i formed between the pair of frame portions 46 at the bottom D of the base portion 42 may be configured so as to become wider from the bottom D towards the top U.

Figure 10:
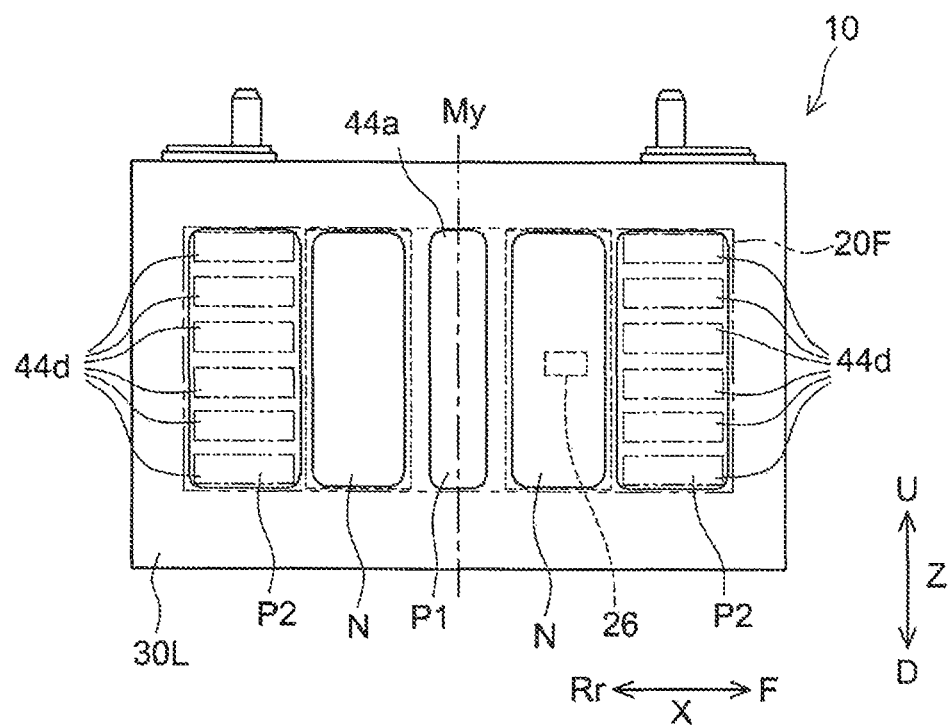
FIG. 10 is a front-view diagram illustrating schematically a relative relationship between a unit cell and a spacer according to another embodiment.

In the above implementation, the moderation region N is formed only at the bottom in the vertical direction Z, on account of the third pressing region P3 that is provided. However, the art disclosed herein is not limited thereto. As illustrated in FIG. 10, for instance, the third pressing region P3 may be omitted in the electrode body 20, and the moderation region N may be provided not only at the bottom D but also at the top U. Such a configuration is useful since in that case the fixing member 26 is easily disposed at the moderation region N, there is achieved the above electrode-position suppression effect, and production of the electrode body 20 is simple. Although not specifically depicted in the figures, the moderation region N may be provided, in addition to the positions illustrated in FIG. 6, also at positions that are line-symmetrical with respect to the center line Mz in the vertical direction Z of the flat portion 20F, as the symmetry axis. In that case, the moderation region N is formed at four positions spaced apart from each other. Such a configuration as well is useful, since an electrodeposition suppression effect is achieved while production of the electrode body 20 is rendered simpler. Although not specifically depicted, a configuration may be adopted wherein the moderation region N is not formed at the position illustrated in FIG. 6, and is instead provided at positions line-symmetrical with respect to the center line Mz as a symmetry axis. Specifically, the arrangement of the fixing member 26 may be prescribed to be at the top U or the bottom D, depending on the arrangement of the rib portions 44 of the spacer 40, when the electrode body 20 is fixed to the upper surface 30U of the battery case 30 via the positive and negative collector plates 22d, 24d.

In the present embodiment the rib portions 44 of the spacer 40 were provided on both faces of the base portion 42. As a result, the unit cells 10 were pressed in the front-rear direction by the spacers 40, at the front F and the rear Rr in the array direction X. However, the configuration of the spacers 40 is not limited thereto. For instance, the rib portions 44 of each spacer 40 may be provided at just either one of the front F and the rear Rr of the base portion 42. In consequence, it becomes possible to secure a wide cooling space in which one spacer 40 is formed, to promote flow of the cooling fluid, and to increase the cooling efficiency of the unit cells 10.

In the assembled battery 1, thus, there are provided the pressing region P at which the electrode body 20 is actively pressed by the spacer 40, and the moderation region N other than the pressing region P; further, the winding end edge 28d of the flat wound electrode body 20 is restrained by the fixing member 26 at the moderation region N. As a result it becomes possible to suppress the occurrence of electrode-position caused by local increases in the thickness of the electrode body 20 by the fixing member 26. In an assembled battery 1 having been imparted with inherent restraining pressure, the inter-electrode distance is kept small; an effect can be elicited thereby in that battery characteristics are enhanced and electrode characteristics can be preserved satisfactorily over long periods of time. Unit cells 10 in which the inter-electrode distance is thus kept small are prone to suffering micro-short-circuits on account of electrodeposition. In the configuration disclosed herein, however, the occurrence of micro short-circuits is likewise suppressed, and accordingly the above effect can be compounded with a superior effect of increasing the safety of the assembled battery 1.

The assembled battery 1 can be used in various applications. The assembled battery 1 can be suitably used as a power source (main battery) in a drive motor mounted in vehicles. The type of vehicle is not particularly limited, and typically includes automobiles, for instance plug-in vehicles (PHV), hybrid vehicles (HV) and electric vehicles (EV).

The present disclosure has been thus explained in detail, but the above embodiments are merely illustrative in nature, and the disclosure disclosed herein encompasses several variations and modifications of the above-described concrete examples.

What is claimed is:

1. An assembled battery, comprising:
a plurality of unit cells each comprising a flat wound electrode body, and a battery case including a pair of opposing side surfaces and accommodating the flat wound electrode body, the unit cells being arrayed in an array direction that intersects the side surfaces;

spacers disposed so as to sandwich the unit cells in the array direction, each spacer comprising a spacer flat portion disposed so as to oppose the side surfaces, and a rib portion protruding from the flat portion towards the side surfaces; and a restraining member that restrains the arrayed unit cells and spacers, in such a manner that an inherent stress is present in a direction in which the unit cells and the spacers are compressed along the array direction, the flat wound electrode body being provided with an elongate positive electrode, an elongate negative electrode, and a fixing member, the positive electrode and the negative electrode being stacked so as to be insulated from each other and being wound so as to yield an oval shape in a sectional view about a winding axis that is a transverse direction perpendicular to a longitudinal direction, a winding end of the flat wound electrode body being fixed by the fixing member, the flat wound electrode body including a flat portion including the stacked positive electrode and negative electrode extending along a major axis of the oval shape and being accommodated in the battery case in such a manner that the flat portion opposes the side surfaces, the flat portion comprising a pressing region and a moderation region other than the pressing region, the pressing region including a pressing site opposing the rib portion, only the pressing region of the flat portion contacts the rib portion, the pressing region including a center of the flat portion in a winding axis direction, and including a first pressing region spanning across the entire flat portion in a direction along the major axis, and the fixing member being disposed entirely within the moderation region.

2. The assembled battery according to claim 1, wherein the pressing region includes a second pressing region provided over a direction along the major axis, at each of both ends of the flat portion in the winding axis direction.

3. The assembled battery according to claim 2, wherein a dimension of the first pressing region in the winding axis direction is smaller than a dimension of the second pressing region in the winding axis direction.

4. The assembled battery according to claim 1,
wherein when the pressing region includes a third pressing region over the flat portion in the winding axis direction,
the third pressing region is disposed within a top ⅔ region in a direction along the major axis, with the assembled battery being disposed so that the major axis matches a vertical direction, and
the moderation region is disposed at least at a bottom ⅓ region in the direction along the major axis.

5. The assembled battery according to claim 1,
wherein the flat wound electrode body is provided with an R portion at which the positive electrode and the negative electrode are curved, the R portion being a portion other than the flat portion, and
the fixing member is not disposed at the R portion.

6. The assembled battery according to claim 1,
wherein when the assembled battery is disposed so that the major axis matches a vertical direction, the spacers have an inflow portion at the bottom, and outflow portions at both ends in the winding axis direction, and
the rib portion is configured in the form of a flow channel wall that is erected along at least part of a flow channel extending from the inflow portion towards the outflow portions.

7. The assembled battery according to claim 1,
wherein the unit cells each contain a nonaqueous electrolyte solution within the battery case.

8. The assembled battery according to claim 1,
wherein only the pressing site of the pressing region of the flat portion contacts the rib portion.

9. An assembled battery, comprising:
a plurality of unit cells each comprising a flat wound electrode body, and a battery case including a pair of opposing side surfaces and accommodating the flat wound electrode body, the unit cells being arrayed in an array direction that intersects the side surfaces;

spacers disposed so as to sandwich the unit cells in the array direction, each spacer comprising a spacer flat portion disposed so as to oppose the side surfaces, and a rib portion protruding from the flat portion towards the side surfaces, the rib portion including a plurality of ribs, a portion of the ribs having a curved shape; and a restraining member that restrains the arrayed unit cells and spacers, in such a manner that an inherent stress is present in a direction in which the unit cells and the spacers are compressed along the array direction, the flat wound electrode body being provided with an elongate positive electrode, an elongate negative electrode, and a fixing member, the positive electrode and the negative electrode being stacked so as to be insulated from each other and being wound so as to yield an oval shape in a sectional view about a winding axis that is a transverse direction perpendicular to a longitudinal direction, a winding end of the flat wound electrode body being fixed by the fixing member, the flat wound electrode body including a flat portion including the stacked positive electrode and negative electrode extending along a major axis of the oval shape and being accommodated in the battery case in such a manner that the flat portion opposes the side surfaces, the flat portion comprising a pressing region and a moderation region other than the pressing region, the pressing region including a pressing site opposing the rib portion, only the pressing region of the flat portion contacts the rib portion, the pressing region including a center of the flat portion in a winding axis direction, and including a first pressing region a direction along the major axis, and the fixing member being disposed entirely within the moderation region.

10. The assembled battery according to claim 9, wherein the pressing region includes a second pressing region provided over a direction along the major axis, at each of both ends of the flat portion in the winding axis direction.

11. The assembled battery according to claim 9,
wherein when the pressing region includes a third pressing region over the flat portion in the winding axis direction,
the third pressing region is disposed within a top ⅔ region in a direction along the major axis, with the assembled battery being disposed so that the major axis matches a vertical direction, and the moderation region is disposed at least at a bottom ⅓ region in the direction along the major axis.

12. The assembled battery according to claim 9,
wherein when the assembled battery is disposed so that the major axis matches a vertical direction,
the spacers have an inflow portion at the bottom, and outflow portions at both ends in the winding axis direction, and
the rib portion is configured in the form of a flow channel wall that is erected along at least part of a flow channel extending from the inflow portion towards the outflow portions.

13. The assembled battery according to claim 9,
wherein the unit cells each contain a nonaqueous electrolyte solution within the battery case.

14. The assembled battery according to claim 9,
wherein only the pressing site of the pressing region of the flat portion contacts the rib portion.

15. An assembled battery, comprising:
a plurality of unit cells each comprising a flat wound electrode body, and a battery case including a pair of opposing side surfaces and accommodating the flat wound electrode body, the unit cells being arrayed in an array direction that intersects the side surfaces;
spacers disposed so as to sandwich the unit cells in the array direction, each spacer comprising a spacer flat portion disposed so as to oppose the side surfaces, and a rib portion protruding from the flat portion towards the side surfaces; and
a restraining member that restrains the arrayed unit cells and spacers, in such a manner that an inherent stress is present in a direction in which the unit cells and the spacers are compressed along the array direction,
the flat wound electrode body being provided with an elongate positive electrode, an elongate negative electrode, and a fixing member,
the positive electrode and the negative electrode being stacked so as to be insulated from each other and being wound so as to yield an oval shape in a sectional view about a winding axis that is a transverse direction perpendicular to a longitudinal direction,
a winding end of the flat wound electrode body being fixed by the fixing member,
the flat wound electrode body including a flat portion including the stacked positive electrode and negative electrode extending along a major axis of the oval shape and being accommodated in the battery case in such a manner that the flat portion opposes the side surfaces,
the flat portion comprising a pressing region and a moderation region other than the pressing region, the pressing region including a pressing site opposing the rib portion, only the pressing region of the flat portion contacts the rib portion,
the pressing region including a center of the flat portion in a winding axis direction, and including a first pressing region a direction along the major axis,
the fixing member being disposed entirely within the moderation region, and
wherein contact between the rib portion and the pressing region is configured to direct airflow in a direction parallel with the winding axis direction and a direction parallel with the major axis direction.

16. The assembled battery according to claim 15, wherein the pressing region includes a second pressing region provided over a direction along the major axis, at each of both ends of the flat portion in the winding axis direction.

17. The assembled battery according to claim 15,
wherein when the pressing region includes a third pressing region over the flat portion in the winding axis direction,
the third pressing region is disposed within a top ⅔ region in a direction along the major axis, with the assembled battery being disposed so that the major axis matches a vertical direction, and
the moderation region is disposed at least at a bottom ⅓ region in the direction along the major axis.

18. The assembled battery according to claim 15,
wherein the flat wound electrode body is provided with an R portion at which the positive electrode and the negative electrode are curved, the R portion being a portion other than the flat portion, and
the fixing member is not disposed at the R portion.

19. The assembled battery according to claim 15,
wherein the unit cells each contain a nonaqueous electrolyte solution within the battery case.

20. The assembled battery according to claim 15,
wherein only the pressing site of the pressing region of the flat portion contacts the rib portion.

* * * * *